United States Patent
DeGostin et al.

(10) Patent No.: US 11,586,786 B2
(45) Date of Patent: Feb. 21, 2023

(54) PROCESS FOR GAS TURBINE ENGINE COMPONENT DESIGN

(71) Applicant: United Technologies Corporation, Farmington, CT (US)

(72) Inventors: Matthew B. DeGostin, Eastford, CT (US); Hoyt Y. Chang, Manchester, CT (US); David A. Burdette, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 552 days.

(21) Appl. No.: 16/678,064

(22) Filed: Nov. 8, 2019

(65) Prior Publication Data
US 2021/0141968 A1    May 13, 2021

(51) Int. Cl.
*G06F 30/17*     (2020.01)
*G06F 30/23*     (2020.01)

(52) U.S. Cl.
CPC .............. *G06F 30/17* (2020.01); *G06F 30/23* (2020.01)

(58) Field of Classification Search
CPC .......... G06F 30/17; G06F 30/00; G06F 30/23; G06F 2119/02
USPC ....................................................... 703/7, 6
See application file for complete search history.

(56) References Cited

U.S. PATENT DOCUMENTS

| | | | |
|---|---|---|---|
| 7,219,043 B2 * | 5/2007 | Rebello | G05B 19/4097 700/182 |
| 7,243,320 B2 | 7/2007 | Chiu et al. | |
| 7,962,867 B2 | 6/2011 | White | |
| 2014/0278292 A1 | 9/2014 | Grellou et al. | |
| 2016/0082502 A1 | 3/2016 | Appleby et al. | |
| 2018/0137219 A1 | 5/2018 | Goldfarb et al. | |
| 2018/0268536 A1 * | 9/2018 | Byers | G06F 30/00 |
| 2019/0138662 A1 | 5/2019 | Deutsch et al. | |

FOREIGN PATENT DOCUMENTS

| | | | | |
|---|---|---|---|---|
| CN | 107577874 | | 1/2018 | |
| EP | 2950276 | | 12/2015 | |
| EP | 3467271 A1 * | | 4/2019 | F01D 21/003 |

OTHER PUBLICATIONS

Liefke, Alexander et al., "Aerodynamic Impact of Manufacturing Variation on a Nonaxisymmetric Multi-Passage Turbine Stage with Adjoint CFD", Jun. 17-19, 2019, ASME Turbo Expo 2019: Turbomachinery Technical Conference and Exposition, Siemens Energy, Inc. (Year: 2019).*

Young, Wen-Bin et al., "Optimization of the Skin Thickness Distribution in the Composite Wind Turbine Blade", 2011, IEEE. (Year: 2011).*

(Continued)

*Primary Examiner* — Cedric Johnson
(74) *Attorney, Agent, or Firm* — Carlson, Gaskey & Olds, P.C.

(57) ABSTRACT

A self-contained computerized system includes a processor and a memory. The memory stores instructions for causing the self-contained computerized system to perform the process of morphing a finite element mesh of a legacy design to the finite element mesh of a component design and applying measurement variations from the legacy design to the finite element mesh of the component design.

15 Claims, 2 Drawing Sheets

(56) References Cited

OTHER PUBLICATIONS

Heinze, Kay et al., "A Parametric Model for Probabilistic Analysis of Turbine Blades Considering Real Geometric Effects", Aug. 21, 2013, CEAS Aeronaut J, Springer. (Year: 2013).*
European Search Report for Application No. 20205901.0 dated Mar. 31, 2021.
Liefke, Alexander et al: "Aerodynamic Impact of Manufacturing Variation on a Nonaxisymmetric Multi-Passage Turbine Stage with Adjoint CFO", Preprint BUW-IMACM 19/10, Mar. 20, 2019 (Mar. 20, 2019), pp. 1-11, XP055787614, Retrieved from the Internet: URL: https://www.imacm.uni-wuppertal.de/fileadmin/imacm/preprints/2019/imacm_19_10.pdf [retrieved on Mar. 19, 2021].
Heinze, Kay et al: "A parametric model for probabilistic analysis of turbine blades considering real geometric effects", CEAS Aeronautical Journal, Springer Vienna, Vienna, vol. 5, No. 1, Aug. 21, 2013 (Aug. 21, 2013), pp. 41-51, XP035324759, ISSN: 1869-5582, DOI: 10.1007/S13272-013-0088-6 [retrieved on Aug. 21, 2013].

* cited by examiner

PROCESS FOR GAS TURBINE ENGINE COMPONENT DESIGN

TECHNICAL FIELD

The present disclosure relates generally to gas turbine engine component design processes, and more specifically to a process for evaluating component design based at least in part on manufacturing variations of legacy components.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section further drives the compressor section to rotate. In some examples, a fan is also connected to the shaft and is driven to rotate via rotation of the turbine as well.

Gas turbine engine components are typically designed and manufactured using strictly deterministic approaches to tolerances, with each dimension being provided a tolerance that is determined independent of other tolerances. Deterministic approaches such as this are less robust to manufacturing variations and can result in rejection of components that would otherwise be acceptable and/or functional if incorporated into an engine or approval of components that may not be ideal for a given application.

SUMMARY OF THE INVENTION

In one example, a process for verifying a component design includes creating a finite element mesh modeling the component design, morphing a finite element mesh of a legacy design to the finite element mesh of the component design, and applying measurement variations from the legacy design to the finite element mesh of the component design.

In another example of the above described process, applying measurement variations from the legacy design to the finite element mesh of the component design includes identifying a plurality of dimensional features of the legacy design and at least one dimensional feature correlation corresponding to at least two of the dimensional features in the plurality of dimensional features.

In another example, any of the above described processes further includes applying each of the dimensional features of the legacy design to a corresponding location of the morphed component design.

In another example of any of the above described processes applying each of the dimensional features of the legacy design to the corresponding location of the component design includes applying at least one dimensional feature correlation to the corresponding location of the component design.

In another example of any of the above described processes the at least one dimensional feature correlation is a probabilistically expected relationship between two dimensional features.

In another example of any of the above described processes the at least one dimensional feature correlation corresponds to a relationship between at least two of wall thickness, chord length, rotation angle, drop distance, concentricity, radial height, radial shift, and axial shift.

In another example of any of the above described processes applying measurement variations from the legacy design to the finite element mesh of the component design occurs during the morph of the finite element mesh of the legacy design to the finite element mesh of the component design.

In another example of any of the above described processes morphing the finite element mesh of the legacy design to the finite element mesh of the component design includes transforming the measurement variations from the legacy design to the component design.

In another example of any of the above described processes applying measurement variations from the legacy design to the finite element mesh of the component design occurs subsequent to morphing the finite element mesh of a legacy design to the finite element mesh of the component design.

Another example according to any of the above described processes includes analyzing the component design including the applied measurement variations and determining an expected functional acceptance of the component design.

Another example according to any of the above described processes includes releasing the component design to a manufacturing system in response to the determined functional acceptance.

In another example any of the above described processes are operated within a self-contained computerized system.

In another example of any of the above described processes the self-contained computerized system is a computer aided design (CAx) system.

In one example, a self-contained computerized system includes a processor and a memory, the memory storing instructions for causing the self-contained computerized system to perform the process of morphing a finite element mesh of a legacy design to the finite element mesh of the component design and applying measurement variations from the legacy design to the finite element mesh of the component design.

In another example of the above described self-contained computerized system, applying measurement variations from the legacy design to the finite element mesh of the component design includes identifying a plurality of dimensional features of the legacy design and at least one dimensional feature correlation corresponding to at least two of the dimensional features in the plurality of dimensional features.

In another example of any of the above described self-contained computerized systems, applying each of the dimensional features of the legacy design to a corresponding location of the morphed component design.

In another example of any of the above described self-contained computerized systems, applying each of the dimensional features of the legacy design to the corresponding location of the component design includes applying the at least one dimensional feature correlation to the corresponding location of the morphed component design.

In another example of any of the above described self-contained computerized systems, the at least one dimensional feature correlation is a probabilistically expected relationship between at least two of wall thickness, chord, rotation angle, drop distance, concentricity, radial height, radial shift, and axial shift.

These and other features of the present invention can be best understood from the following specification and drawings, the following of which is a brief description.

DETAILED DESCRIPTION

Figure 1:
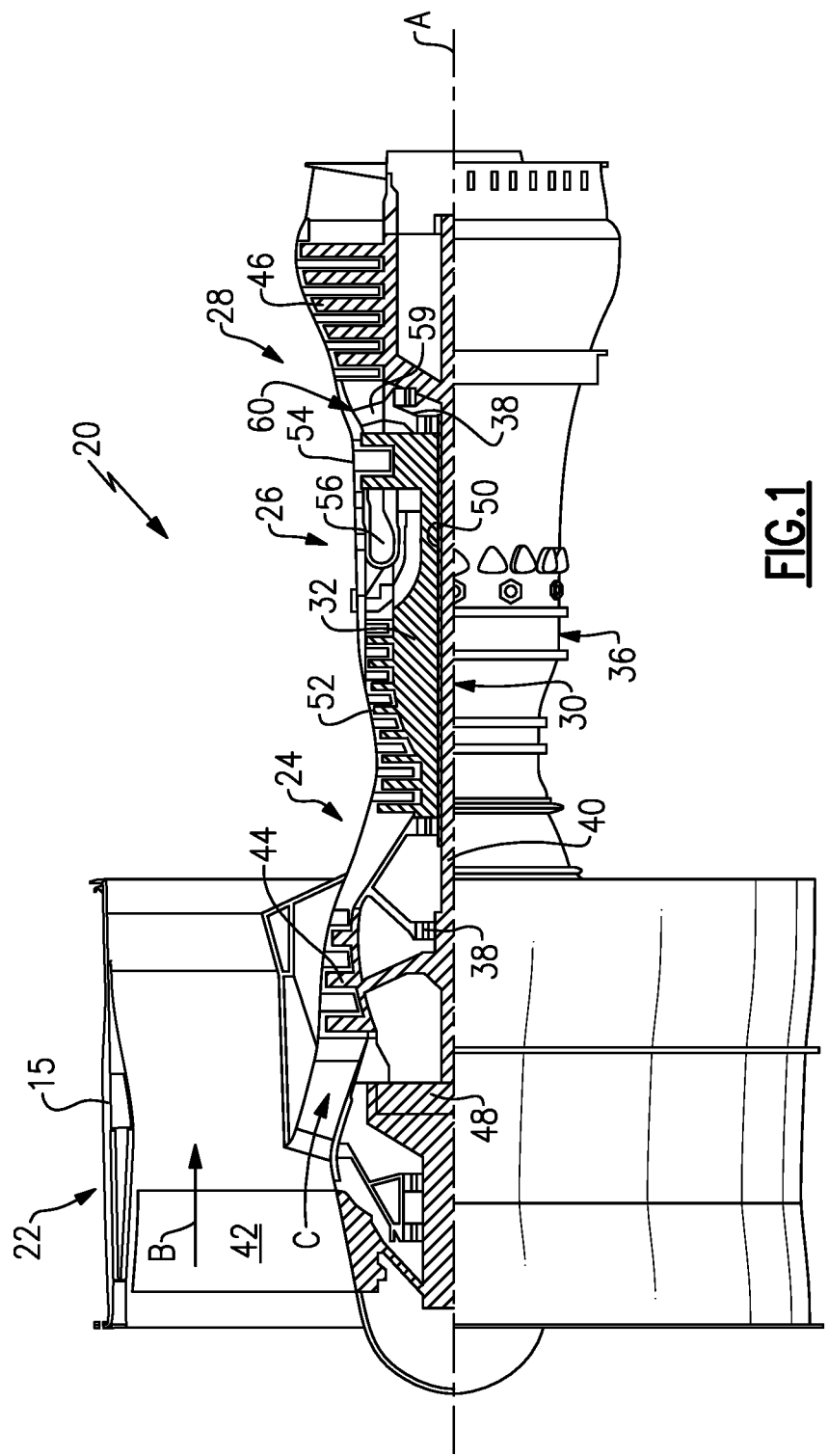
FIG. 1 illustrates an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 60 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Deterministic component design approaches can lead to aircraft component designs which are not robust to manufacturing variation and result in generic tolerance bands that are a poor proxy for a part's functionally acceptable geometry. A functionally acceptable geometry is one that meets functional requirements of the component even if one or more dimension is outside of deterministic tolerances. By shifting away from the deterministic approaches to part geometry, the design phase is able to account for manufacturing variations identified in previous designs of a component (referred to as legacy designs or legacy components). One system that enables the shift from deterministic approaches to the geometry variation approach is a mesh morphing approach that maps inspected features from a legacy design to a corresponding location on a new design of the component.

Figure 2:
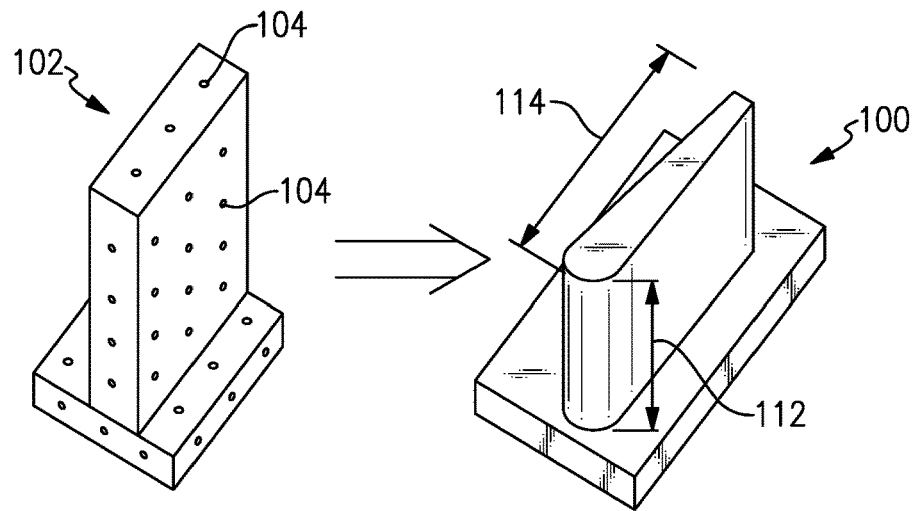
FIG. 2 illustrates a gas turbine engine component according to a legacy design and a new design.

With continued reference to FIG. 1, FIG. 2 schematically illustrates an example new component design 100. The new component design 100 is a variation from a previously existing legacy component 102. The legacy component 102 is a component design that has been manufactured for existing engines, and includes multiple features 104 where the legacy component 102 is measured after being manufactured in a dimensional inspection step. While illustrated in the Figures and described using "points" it is appreciated that the measurements and points can be other types of features or tolerance dimensions such as chord length at a particular radial height, drop distances from a datum to a specific feature, concentricity, etc. and the "point" refers to the location(s) of the feature for the purposes of mapping the feature from the legacy component 102 to the new component design 100.

Each manufactured three dimensional legacy component 102 is represented as a three dimensional mesh, with the multiple dimensional features 104 being applied to the 3D mesh. The mesh model of each legacy component 102 is stored in a database and is analyzed using existing statistical methods to determine the probabilities of measured manufacturing variations at each dimensional feature 104, and to determine what variations are likely to occur due to manufacturing variations.

It is appreciated that new component designs 100 may not have identical dimensions and the dimensional features 104 of the legacy design 102 do not simply correspond to points on the new component design 100. By way of example, the illustrated new component design 100 has a shorter radial height 112 and a longer axial length 114 than the legacy component 102 that the new component design 100 is replacing. However, it is still possible to predict the manufacturing variability of the new component design 100 using the manufacturing variability of the legacy component 102 using the method disclosed in this specification. In order for the predictions to provide meaningful analysis, the legacy component 102 and the new component 100 should be sufficiently similar in form (e.g. shape and size), manufacturing (i.e. the process for manufacturing the components), or both.

Figure 3:
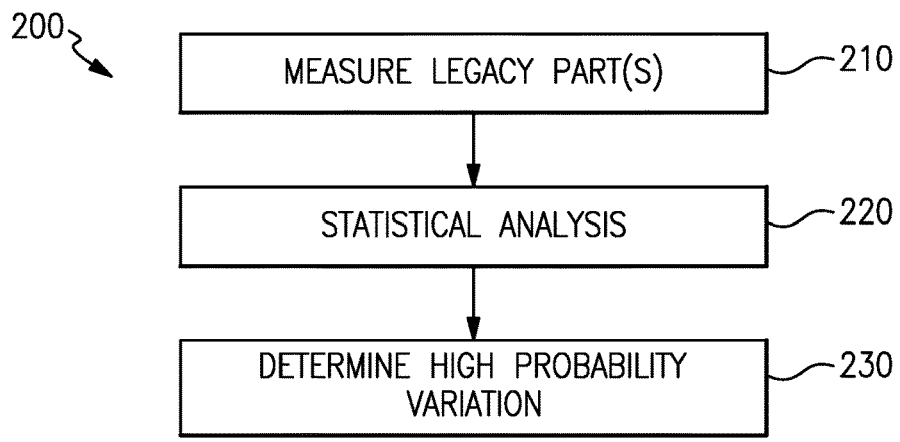
FIG. 3 illustrates a process for determining a variability of a legacy component design.

With continued reference to FIG. 2, FIG. 3 schematically illustrates an exemplary process 200 for determining manufacturing variation using legacy component 102. After each component is manufactured, the dimensional features 104 are measured and functionally analyzed in a "Measure Legacy Part(s)" step 210. The dimensional features 104 are provided to a statistical analysis tool in a "Statistical Analysis" step 220. Historical observations of dimensional features 104 from units of legacy component 102 are aggregated during this statistical analysis.

After performing the statistical analysis, the process 200 determines which variations, and which dimensional features 104 have a high probability of occurring in a "Determine High Probability Variation" step 230. Numerous existing statistical methods can be used to determine these likely variations, including Principal Component Analysis (PCA), clustering, or machine learning methods, for example. The determined high probability variations can be for a single dimension or for two or more dimensions that vary in a correlated manner.

In one example, a dimensional feature 104 can determine the thickness of the component wall at the location of the dimensional feature 104. Within the population of manufactured parts, that wall thickness may be statistically correlated with the wall thickness at another location, measured as another dimensional feature 104. By way of example, dimensional features 104 can include wall thickness, chord length, rotation angle, drop distance, concentricity, radial height, radial shift, and axial shift. The enumerated list is exemplary in nature, and other dimensional features may be correlated instead of or in addition to the enumerated features.

Once measurements of the chosen dimensional features for multiple units of legacy component 102 are included in the database, statistical analysis is used on the database to determine probabilistic variations in a single dimension or in multiple correlated dimensions. By way of example, the statistical analysis may determine that the component is likely to shift axially with large variation, with relatively little radial variation. Knowing the likely variations allows for corresponding tolerances that provide as much room as possible in the axial dimension to be designed, potentially at the expense of radial tolerance. Similar tradeoffs and design features can be implemented based on any determination and the axial shift/radial shift tradeoff is merely exemplary. This type of analysis is performed on each dimensional measurement feature 104 in functionally acceptable geometries, and can include relatively simple analysis and more complex analysis depending on the amount of data measured at the dimensional measurement feature 104.

In some examples, such as those where the new component design 100 varies in a substantial way from the legacy component 102, the correlations can be adjusted to account for changes between the designs. By way of example, if the new component 100 is twice the size of the legacy component 102, the variations observed on the legacy component 102 may need to be scaled by a multiple of two when applied to the new component 100, if the variation magnitude is assumed to be proportional to the component size. The scaling is, in some examples, performed manually by a designer as part of the design process. In practice, it is impractical for a person to transform the variations manually at least because of the time it would take to complete them.

Figure 4:
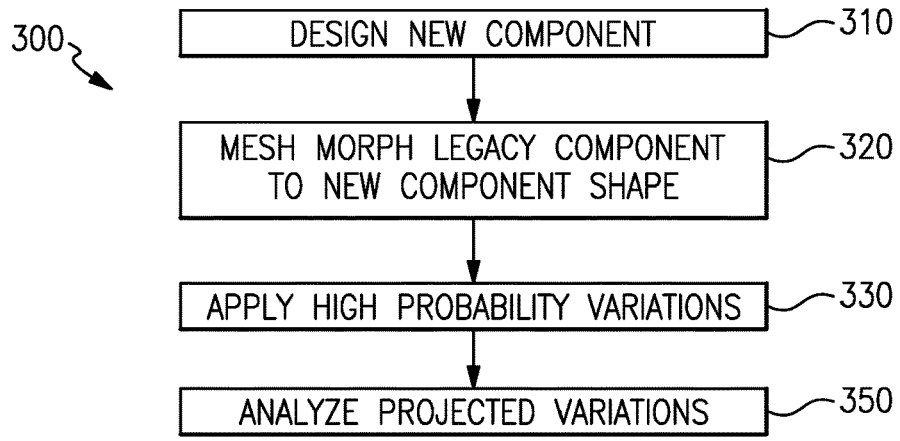
FIG. 4 illustrates a process for applying a variability of a legacy component design to a new component design.

Once the high probability variations for a given set of dimensional features 104 are determined, a second process 300, illustrated in FIG. 4, is utilized to apply those variations to corresponding positions on the new component design 100 even if the new component design 100 does not map 1:1 to the legacy component 102. In the process 300, initially a new component design 100 is determined in a design new component step 310. The new component design 310 is a modification to the legacy component 102 and/or a component designed to replace the legacy component in a new engine. The more similar the new component design is to the legacy component in terms of topology and manufacturing, the easier this process is. As part of the design of the new component 100, multiple dimensional points are identified, along with what parameter(s) will be measured at that dimensional point, and a finite element mesh of the new component design is generated.

Once the finite element mesh of the new component 100 has been generated, the legacy component design is morphed onto the new component mesh using any existing finite element mesh morphing technique in a "Mesh Morph Legacy Component to New Component Shape" step 320. By way of example, existing computer design systems such as Altair HyperMesh or Sculptor can be used to perform the mesh morphing using standard tools. The result of this operation is a distorted mesh mapping the legacy component design 102 to the new component design 100. Once mapped to new component design 100, the dimensional features 104 of the legacy component 102 are mapped directly onto the morphed finite element mesh of the new component design 100, and the high probability manufacturing variations can be applied to the new component design 100 in an "Apply Transformation" step 330. If a given dimensional feature 104 on the legacy design corresponds to a high probability variation, then that variation is applied to the corresponding location of the morphed finite element mesh in the apply high probability variation step 330. In some examples the variations are applied directly to the corresponding location after the mesh morph operation has been performed. In alternative examples the variation is incorporated as part of the legacy component design, and the variation is transformed during the mesh morphing process along with the legacy design. This approach automates the optional manual transformation of the variations that was mentioned previously.

Once the high probability variations are ported to the new component design 100, the new component design 100 is analyzed to determine if the expected variations are functionally acceptable, as defined above. When the expected variations are functionally acceptable, the new component design 100 is released to a manufacturing system which can then begin manufacturing the new component design 100, begin prototyping the new component design 100, schedule the new component design 100 for manufacturing, or any other manufacturing step.

Mesh morphing the legacy component design 102 onto the new component design 100 allows the process 200, 300 to track a probabilistic view of how the variation of the legacy component 102 will inform the deformation of the new component design. This impact is then utilized in a finite element analysis, or any other relevant analysis type such as computational fluid dynamics, and a functional analysis of the new component design, and the design can be verified or disqualified and sent to be reworked in an "Analyze Projected Variations" step 350.

While described above as a general process, it is appreciated that the process can be performed within a singular self-contained computerized system, such as a computer aided design (CAx) system, or carried out by a single user across multiple computerized tools depending on the needs and requirements of a given design flow.

By utilizing the above described process and analysis, a designer can make use of existing information from a legacy design to determine highly probably dimensional variations of a new component design and then account for those variations using functional acceptability. Thus, it is not necessary to manufacture a number of units of the new component design to take dimensional measurements to determine the high probability dimensional variations, thus making it easier to place the dimensional tolerances more in line with functional acceptability. This simultaneously improves manufacturing yield, reduces engineering support required for qualification of manufactured components, and improves the reliability of the manufactured parts.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A process for verifying a component design comprising:
   creating a finite element mesh modeling the component design;
   morphing a finite element mesh of a legacy design to the finite element mesh of the component design; and
   applying measurement variations from the legacy design to the finite element mesh of the component design by identifying a plurality of dimensional features of the legacy design and at least one dimensional feature correlation corresponding to at least two of the dimensional features in the plurality of dimensional features,
   wherein the at least one dimensional feature correlation is a probabilistically expected relationship between two dimensional features.

2. A process for verifying a component design comprising:
   creating a finite element mesh modeling the component design;
   morphing a finite element mesh of a legacy design to the finite element mesh of the component design; and
   applying measurement variations from the legacy design to the finite element mesh of the component design subsequent to morphing the finite element mesh of a legacy design to the finite element mesh of the component design.

3. The process of claim 2, wherein applying measurement variations from the legacy design to the finite element mesh of the component design comprises identifying a plurality of dimensional features of the legacy design and at least one dimensional feature correlation corresponding to at least two of the dimensional features in the plurality of dimensional features.

4. The process of claim 3, comprising applying each of the dimensional features of the legacy design to a corresponding location of the morphed component design.

5. The process of claim 4, wherein applying each of the dimensional features of the legacy design to the corresponding location of the component design includes applying at least one dimensional feature correlation to the corresponding location of the component design.

6. The process of claim 3, wherein the at least one dimensional feature correlation corresponds to a relationship between at least two of wall thickness, chord length, rotation angle, drop distance, concentricity, radial height, radial shift, and axial shift.

7. The process of claim 2, wherein applying measurement variations from the legacy design to the finite element mesh of the component design occurs during the morph of the finite element mesh of the legacy design to the finite element mesh of the component design.

8. The process of claim 7, wherein morphing the finite element mesh of the legacy design to the finite element mesh of the component design includes transforming the measurement variations from the legacy design to the component design.

9. The process of claim 2, further comprising analyzing the component design including the applied measurement variations and determining an expected functional acceptance of the component design.

10. The process of claim 9, further comprising releasing the component design to a manufacturing system in response to the determined functional acceptance.

11. The process of claim 2, wherein the process is operated within a self-contained computerized system.

12. The process of claim 11, wherein the self-contained computerized system is a computer aided design (CAx) system.

13. A self-contained computerized system comprising:
    a processor and a memory, the memory storing instructions for causing the self-contained computerized system to perform the process of morphing a finite element mesh of a legacy design to the finite element mesh of the component design and applying measurement variations from the legacy design to the finite element mesh of the component design by at least identifying a plurality of dimensional features of the legacy design and at least one dimensional feature correlation corresponding to at least two of the dimensional features in the plurality of dimensional features; and the at least one dimensional feature correlation is a probabilistically expected relationship between at least two of wall thickness, chord, rotation angle, drop distance, concentricity, radial height, radial shift, and axial shift.

14. The self-contained computerized system of claim 13, comprising applying each of the dimensional features of the legacy design to a corresponding location of the morphed component design.

15. The self-contained computerized system of claim 14, wherein applying each of the dimensional features of the legacy design to the corresponding location of the component design includes applying the at least one dimensional feature correlation to the corresponding location of the morphed component design.

* * * * *